(12) United States Patent
Yu et al.

(10) Patent No.: US 11,697,326 B2
(45) Date of Patent: Jul. 11, 2023

(54) VENT DEVICE HAVING ONE OR MORE STAGE VENTILATION ASSEMBLIES

(71) Applicant: ILLINOIS TOOL WORKS INC., Glenview, IL (US)

(72) Inventors: Jie Yu, Shanghai (CN); Jibang Yang, Shanghai (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 70 days.

(21) Appl. No.: 17/236,379

(22) Filed: Apr. 21, 2021

(65) Prior Publication Data

US 2021/0331561 A1 Oct. 28, 2021

(30) Foreign Application Priority Data

Apr. 27, 2020 (CN) .......................... 202010343939.3

(51) Int. Cl.
*B60H 1/34* (2006.01)

(52) U.S. Cl.
CPC ..... *B60H 1/345* (2013.01); *B60H 2001/3471* (2013.01)

(58) Field of Classification Search
CPC ................... F24F 13/12; F24F 13/062; B60H 2001/3471; B60H 1/345; B60H 1/3407; B60H 1/3414

USPC ................... 454/300, 311, 312, 310
See application file for complete search history.

(56) References Cited

U.S. PATENT DOCUMENTS

2010/0175397 A1\* 7/2010 Choi ..................... F24F 1/0047
62/132

FOREIGN PATENT DOCUMENTS

| AU | 710042 B | \* | 9/1999 | ............ F24F 13/062 |
| KR | 20020011828 A | \* | 2/2002 | ............ F24F 13/062 |

\* cited by examiner

*Primary Examiner* — Edelmira Bosques
*Assistant Examiner* — Michael James Giordano
(74) *Attorney, Agent, or Firm* — Quarles & Brady LLP

(57) ABSTRACT

A vent device includes at least one stage ventilation assembly, each stage of the at least one stage ventilation assembly includes an inner layer element and an outer layer element. An air duct is formed between the outer layer element and the inner layer element, and the air duct has an air duct outlet. Each stage of the at least one stage ventilation assembly has an air duct open position and closed position. The outer layer element and the inner layer element are configured to be able to move along the first direction relative to each other between the air duct open position and closed position. In the air duct closed position, the inner layer element closes the air duct outlet, and in the air duct open position, the inner layer element opens the air duct outlet.

11 Claims, 12 Drawing Sheets

VENT DEVICE HAVING ONE OR MORE STAGE VENTILATION ASSEMBLIES

CROSS REFERENCES TO RELATED APPLICATIONS

This application claims priority to Chinese Application Serial No. 202010343939.3, filed Apr. 27, 2020, the contents of which are incorporated herein by reference in their entirety.

TECHNICAL FIELD

This present disclosure relates to a vent device, and in particular to a vent device arranged in a vehicle.

BACKGROUND

An existing motor vehicle typically comprises an air conditioner and a vent device in the interior of the vehicle, and the vent device can supply an airflow generated by the air conditioner to the interior of the vehicle for adjusting the temperature thereof, and can adjust the flow rate and direction of the airflow.

SUMMARY OF THE DISCLOSURE

At least one object of the present disclosure is to provide a vent device, comprising: at least one stage ventilation assembly, each stage of the at least one stage ventilation assembly comprising an inner layer element and an outer layer element, the outer layer element having a cavity extending along a first direction through the outer layer element, the inner layer element arranged in the cavity, an air duct formed between the outer layer element and the inner layer element, the air duct having an air duct outlet, and the air duct outlet configured to be able to be opened or closed; wherein, the each stage of the at least one stage ventilation assembly has an air duct open position and an air duct closed position, the outer layer element and the inner layer element are configured so as to be able to move along the first direction relative to each other between the air duct open position and the air duct closed position, wherein, in the air duct closed position, the inner layer element closes the air duct outlet, and in the air duct open position, the inner layer element opens the air duct outlet.

According to the above, the outer layer element has an inner side wall, the cavity is enclosed by the inner side wall, the inner side wall has a cavity outlet end forming the air duct outlet; and the inner layer element comprises a guiding portion having a tapered section, at least a portion of which has an outer circumferential dimension corresponding to an inner circumferential dimension of a top of the inner side wall such that in the air duct closed position, the at least a portion of the tapered section can engage with the cavity outlet end to close the air duct outlet; in the air duct open position, the tapered section can disengage from the cavity outlet end and define a discharge direction of an airflow discharged from the air duct outlet.

According to the above, the inner layer element further comprises a stem portion connected to the guiding portion, a smaller dimension end of the tapered section is connected to the stem portion, the stem portion has a gap with the inner side wall of the outer layer element to form at least a portion of the air duct.

According to the above, the at least one stage ventilation assembly comprises a first stage ventilation assembly and a second stage ventilation assembly, the inner layer element of the second stage ventilation assembly is arranged around the outer layer element of the first stage ventilation assembly.

According to the above, the vent device further comprises a driving device, the driving device comprises a driving shaft extending along a second direction; a transmission assembly connecting to the driving shaft, the transmission assembly is configured to selectively engage with the first stage ventilation assembly or the second stage ventilation assembly within different rotational angular ranges of the driving shaft to drive the outer layer element and the inner layer element of the first stage ventilation assembly or the second stage ventilation assembly to move up and down relative to each other along the first direction by the driving device.

According to the above, the transmission assembly comprises a first stage transmission gear and a second stage transmission gear, each of the transmission gears is configured to enable the outer layer element and the inner layer element in the respective ventilation assembly to move along the first direction relative to each other; the outer layer element of each stage of the at least one stage ventilation assembly is provided with outer layer mesh teeth arranged along the first direction, and the inner layer element is provided with inner layer mesh teeth arranged along the first direction, the outer layer mesh teeth and the inner layer mesh teeth are meshed with the transmission gears on opposite sides of a respective one of transmission gears.

According to the above, the transmission assembly further comprises a first stage clutch device and a second stage clutch device connected to the driving shaft, the driving shaft is engaged with or disengaged from the first stage transmission gear through the first stage clutch device, the driving shaft is engaged with or disengaged from the second stage transmission gear through the second stage clutch device; wherein, the first stage clutch device is arranged within a first angular range of the driving shaft, the driving shaft can be engaged with the first stage ventilation assembly through the first stage transmission gear, and within a second angular range of the driving shaft, the driving shaft can be disengaged from the first stage ventilation assembly; and the second stage clutch device is arranged within a first angular range of the driving shaft, the driving shaft can be disengaged from the second stage ventilation assembly, and within a second angular range of the driving shaft, the driving shaft can be engaged with the second stage ventilation assembly through the second stage transmission gear.

According to the above, the vent device further comprises: a base, by which the at least one stage ventilation assembly is supported; and a motion guiding assembly, comprising at least one guiding portion arranged on the base and a guided portion arranged on the inner layer element of each stage of the at least one stage ventilation assembly, the at least one guiding portion and the guided portion extending along a first direction and cooperating with each other, to define a moving direction of the inner layer element of each stage of the at least one stage ventilation assembly relative to the base.

According to the above, the vent device further comprises: a limiting structure, arranged on the moving path of the inner layer element or the outer layer element of each stage of the at least one stage ventilation assembly, the limiting structure being configured such that when each stage of the at least one stage ventilation assembly reaches an air duct open position, the limiting structure blocks the inner layer element and the outer layer element from continuing to move relative to each other.

According to the above, the inner layer element and the outer layer element of each stage of the at least one stage ventilation assembly are shaped such that the air duct therebetween is annular.

DETAILED DESCRIPTION OF EMBODIMENTS

Various specific embodiments of the present disclosure are described below with reference to the accompanying drawings which constitute part of this description. It should be understood that although the terms, such as "front", "rear", "upper", "lower", "left", "right", "top", "bottom", "inner" and "outer", indicating orientations are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations.

Figure 1A:
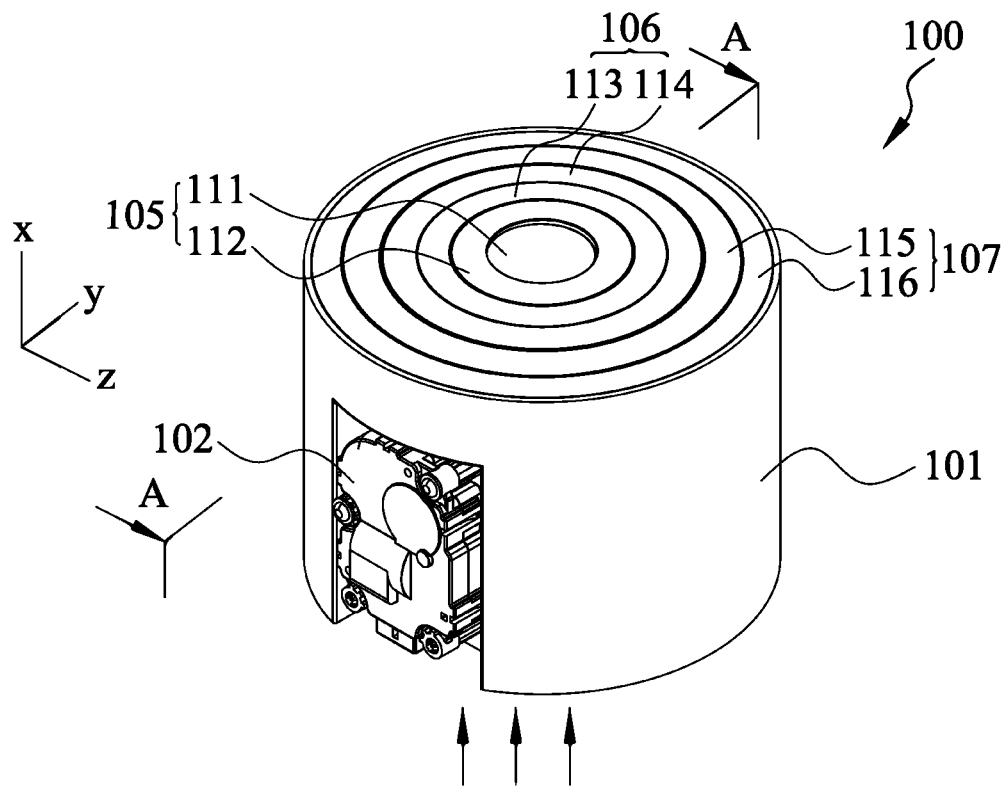
FIG. 1A is a perspective view of a vent device of the present disclosure observed from the top.
Figure 1B:
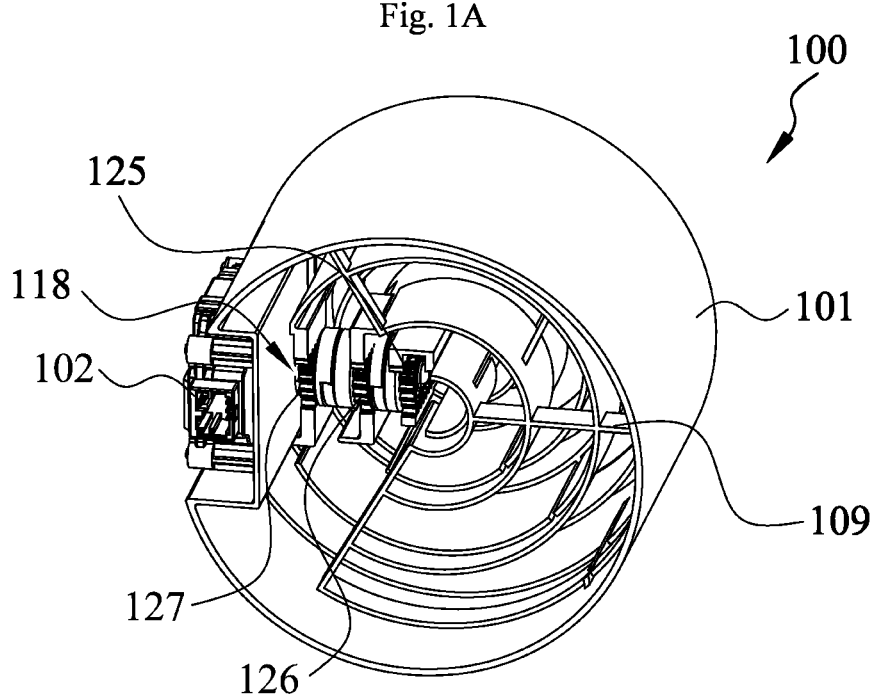
FIG. 1B is a perspective structural view of the vent device of FIG. 1A observed from the bottom.

FIGS. 1A and 1B are perspective views of a vent device 100 according to the present disclosure observed from different perspectives, for illustrating the general shape of the vent device 100.

As shown in FIGS. 1A and 1B, the vent device 100 comprises a substantially cylindrical housing 101 and a base 109 located inside the housing 101. The base 109 has a hollowed-out shape that substantially does not block the airflow, so that the airflow can pass through the base 109 from the downside of the base 109. The vent device 100 further comprises a first stage ventilation assembly 105, a second stage ventilation assembly 106 and a third stage ventilation assembly 107 constructed as several concentric rings from inside to outside that are arranged on the base 109. Each of the stage ventilation assemblies 105, 106, 107 has an air duct (see the first stage air duct 234, second stage air duct 235, and third stage air duct 236 in FIG. 2A). An air duct inlet is located at the bottom of the vent device 100, and an air duct outlet is located at the top of the vent device 100. Each of the stage ventilation assemblies 105, 106, 107 has an air duct open position and an air duct closed position. When the particular stage ventilation assembly 105, 106, 107 is in the air duct open position, the corresponding air duct outlet of the stage ventilation assembly 105, 106, 107 is opened; and when the stage ventilation assembly 105, 106, 107 is in the air duct closed position, the corresponding air duct outlet of the stage ventilation assembly 105, 106, 107 is closed. For example, in the state shown in FIG. 1A, each of the stage ventilation assemblies 105, 106, 107 is in the air duct closed position, while in the state shown in FIG. 8C, each of the stage ventilation assemblies 105, 106, 107 is in the air duct open position. By selectively opening these air duct outlets, the airflow (for example, the temperature-regulated airflow from a vehicle air conditioner) can pass through the base 109 from the air duct inlet at the bottom of the vent device 100 along an axial direction (i.e., a first direction or an x-direction) of the housing 101, then pass through the corresponding air duct, and then be discharged from the air duct outlet at the top of the vent device 100.

The vent device 100 further comprises a driving device. The driving device comprises a motor 102. The motor 102 is mounted on the housing 101, and a driving shaft 203 (see FIG. 2A) of the motor 102 extends into the housing 101 along a radial direction (i.e., a second direction or a y-direction) of the housing 101. The driving shaft 203 of the motor 102 is connected to a transmission assembly 118. The air duct outlets of the first stage ventilation assembly 105, the second stage ventilation assembly 106 and the third stage ventilation assembly 107 can be selectively opened by the transmission assembly 118. As an example, the motor 102 is a stepper motor.

Specifically, the first stage ventilation assembly 105 comprises an inner layer element 111 and an outer layer element 112, the second stage ventilation assembly 106 comprises an inner layer element 113 and an outer layer element 114, and the third stage ventilation assembly 107 comprises an inner layer element 115 and an outer layer element 116. In each set of the ventilation assemblies, the outer layer element is arranged around the respective inner layer element. And between adjacent ventilation assemblies, specifically, the inner layer element 113 of the second stage ventilation assembly 106 is arranged around the outer layer element 112 of the first stage ventilation assembly 105, and the inner layer element 115 of the third stage ventilation assembly 107 is arranged around the outer layer element 114 of the second stage ventilation assembly 106. Therefore, these ventilation assemblies are formed as several concentric rings in sequence. The transmission assembly 118 comprises a first stage transmission gear 125, a second stage transmission gear 126, and a third stage transmission gear 127, which are connected to the first stage ventilation assembly 105, the second stage ventilation assembly 106, and the third stage ventilation assembly 107, respectively. The motor 102 can select the first stage transmission gear 125, the second stage transmission gear 126 or the third stage transmission gear 127 to drive the inner layer element and the outer layer element of the corresponding stage ventilation assembly 105, 106, 107 to relatively move up and down along the x-direction, so as to reach the corresponding air duct open position and air duct closed position, which will be described in detail below.

In this embodiment, each stage ventilation assembly 105, 106, 107 has a generally cylindrical profile, so that an annular air duct and air duct outlet can be formed between the inner layer element and the outer layer element. In other embodiments, according to the volume requirements of the vent device 100, air ducts and air duct outlets of other shapes can also be formed by configuring the profile of the inner layer elements and the outer layer elements.

Figure 2A:
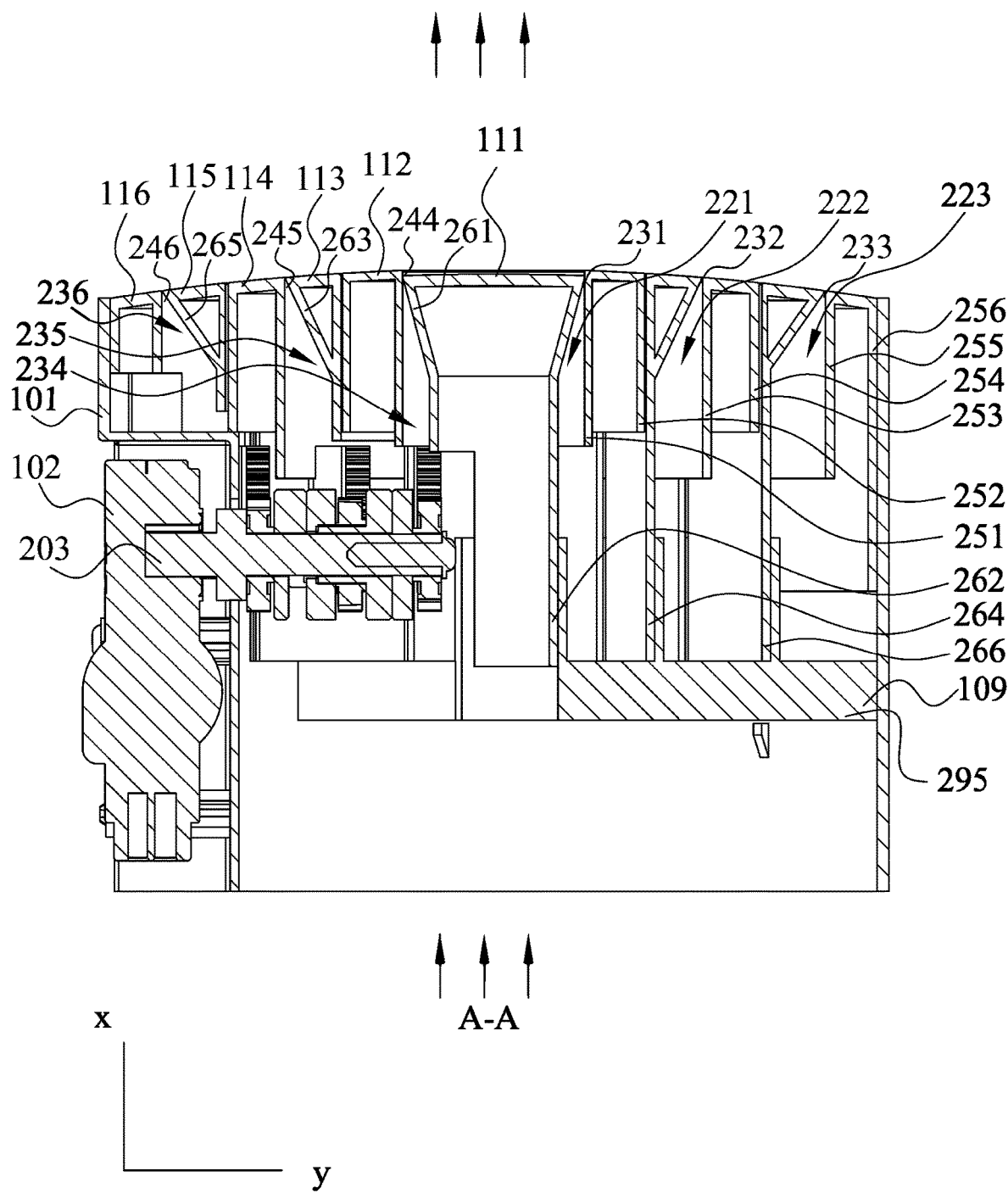
FIG. 2A is a sectional view of the vent device of FIG. 1A taken along line A-A in FIG. 1A.
Figure 2B:
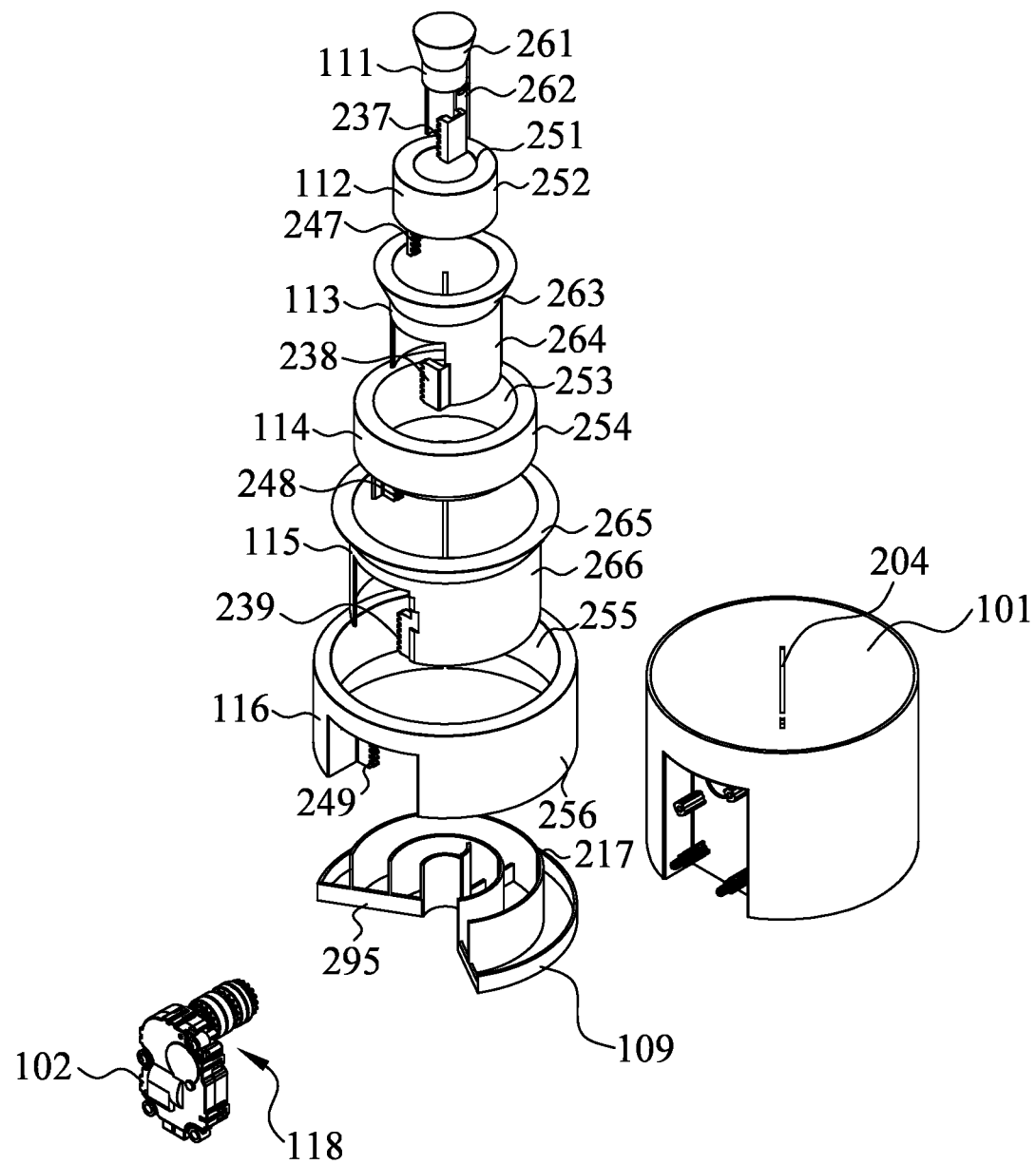
FIG. 2B is an exploded view of the vent device of FIG. 1A.

FIG. 2A shows a sectional view of the vent device 100 in FIG. 1A taken along line A-A, and FIG. 2B shows an exploded structure diagram of the vent device 100, which is used to explain the specific structure of each stage of ventilation assembly in the vent device 100.

As shown in FIG. 2A and FIG. 2B, in the first stage ventilation assembly 105, the outer layer element 112 comprises an inner side wall 251 and an outer side wall 252. The inner side wall 251 and the outer side wall 252 are generally coaxial cylindrical shapes and connected to each other at the top. The inner side wall 251 encloses and defines a first stage cavity 221. The inner layer element 111 is disposed in the first stage cavity 221. The top of the first stage cavity 221 has a cavity outlet end 231. The cavity outlet end 231 is used to form an air duct outlet 244 of the first stage air duct 234. The first stage cavity 221 between the outer layer element 112 and the inner layer element 111 below the cavity outlet end 231 is used to form a first stage air duct 234 for the airflow to pass through.

The inner layer element 111 comprises a guiding portion 261 and a stem portion 262 connected to the lower end of the guiding portion 261. As an example, the guiding portion 261 comprises a tapered section of an inverted cone shape from top to bottom, and the smaller dimension end (i.e., the bottom end) thereof is connected to the stem portion 262 and has the same size as the top of the stem portion 262. The outer circumferential dimension of the larger dimension end (i.e., the top end) of the tapered section (i.e., the guiding portion 261) is identical to the inner circumferential dimension of the top of the inner side wall 251 of the outer layer element 112. In this embodiment, the inner side wall 251 of the outer layer element 112 and the stem portion 262 of the inner layer element 111 both extend vertically along the x-direction, and the tapered shape of the guiding portion 261 of the inner layer element 111 can form a gap between the inner side wall 251 and the stem portion 262, which gap forms a part of the first stage air duct 234. As shown in FIG. 2A, the larger dimension end of the tapered section abuts against the cavity outlet end 231, such that when the top end of the guiding portion 261 is flush with the top end of the outer layer element 112, the tapered section (i.e., the guiding portion 261) can close the air duct outlet 244. At this time, the first stage ventilation assembly 105 is in the air duct closed position. When the inner layer element 111 moves upward relative to the outer layer element 112 along the x-direction, the guiding portion 261 of the inner layer element 111 can leave the cavity outlet end 231, and the guiding portion 261 opens the air duct outlet 244, so that the first stage ventilation assembly 105 can reach the air duct open position. In this embodiment, while the inner layer element 111 moves upward, the outer layer element 112 also moves downward. In some other embodiments, it's also possible that only one of the inner layer element 111 or the outer layer element 112 can move to open or close the air duct outlet. Furthermore, it can be understood by those skilled in the art that, instead of the inverted cone shape from top to bottom, the guiding portion 261 may only needs to comprise a larger dimension part corresponding to the cavity outlet end 231 and a smaller dimension part smaller than the larger dimension part, such that the guiding portion 261 can close or open the air duct outlet 244.

Similar to the first stage ventilation assembly 105, in the second stage ventilation assembly 106, the outer layer element 114 also comprises an inner side wall 253 and an outer side wall 254, and the inner layer element 113 also comprises a guiding portion 263 and a stem portion 264. The inner side wall 253 encloses and defines a second stage cavity 222. The second stage cavity 222 has a cavity outlet end 232. A second stage air duct 235 is formed between the outer layer element 114 and the inner layer element 113, and the second stage air duct 235 forms an air duct outlet 245 at the cavity outlet end 232. When the inner layer element 113 and the outer layer element 114 move upward or downward relative to each other along the x-direction, the guiding portion 263 of the inner layer element 113 can open or close the air duct outlet 245.

Similar to the first stage ventilation assembly 105 as well, in the third stage ventilation assembly 107, the outer layer element 116 also comprises an inner side wall 255 and an outer side wall 256, and the inner layer element 115 also comprises a guiding portion 265 and a stem portion 266. The inner side wall 255 encloses and defines a third stage cavity 223. The third stage cavity 223 has a cavity outlet end 233. A third stage air duct 236 is formed between the outer layer element 116 and the inner layer element 115, and the third stage air duct 236 forms an air duct outlet 246 at the cavity outlet end 233. When the inner layer element 115 and the outer layer element 116 move upward or downward relative to each other along the x-direction, the guiding portion 265 of the inner layer element 115 can open or close the air duct outlet 246.

Still, as shown in FIGS. 2A and 2B, the inner layer element 113 of the second stage ventilation assembly 106 and the inner layer element 115 of the third stage ventilation assembly 107 are of hollowed-out shapes, such that when the first stage ventilation assembly 105, the second stage ventilation assembly 106 and the third stage ventilation assembly 107 are arranged as several concentric rings, the inner layer element 113 of the second stage ventilation assembly 106 can accommodate the first stage ventilation assembly 105 and the inner layer elements 115 of the third stage ventilation assembly 107 can accommodate the second stage ventilation assembly 106. In this embodiment, the outer circumferential dimension of the outer side wall 252 of the outer layer element 112 of the first stage ventilation assembly 105 is identical to the inner circumferential dimension of the inner layer element 113 of the second stage ventilation assembly 106, such that the inner layer element 113 can abut against the outer side wall 252 when the inner layer element 113 accommodates the first stage ventilation assembly 105, thereby preventing the airflow from leaking between the first stage ventilation assembly 105 and the second stage ventilation assembly 106. Similarly, the outer circumferential dimension of the outer side wall 254 of the outer layer element 114 of the second stage ventilation assembly 106 is identical to the inner circumferential dimension of the inner layer element 115 of the third stage ventilation assembly 107 to prevent the airflow from leaking between the second stage ventilation assembly 106 and the third stage ventilation assembly 107. It should be noted that, although the outer side wall of the outer layer element generally abuts against the adjacent inner layer element, they both have relatively smooth metal or plastic surfaces, resulting in a frictional resistance within an acceptable range, which will not hinder their upward or downward motion. In some embodiments, it is also possible to leave a narrow clearance between the outer layer element and its adjacent inner layer element to reduce the friction resistance during their relative motion.

In each of the stage ventilation assemblies 105, 106, 107, the guiding portion of the inner layer element can also define the discharge direction of the airflow discharged from the corresponding air duct outlet, so that the airflow is diffused and discharged along the direction of the guiding portion. By configuring the taper angle (i.e., the angle between the conical surface of the guiding portion and the x-direction) of the guiding portion of the inner layer element in each of the stage ventilation assemblies 105, 106, 107, the airflow can be discharged upward and diffused outward when the corresponding air duct outlet is opened. As a specific example, in the first stage ventilation assembly 105, the taper angle of the guiding portion 261 of the inner layer element 111 is 15°. In the second stage ventilation assembly 106, the taper angle of the guiding portion 263 of the inner layer element 113 is 25°. In the third stage ventilation assembly 107, the taper angle of the guiding portion 265 of the inner layer element 115 is 35°.

In addition, in order to better guide the upward or downward motion of the inner layer elements of each of the stage ventilation assemblies 105, 106, 107 along the x-direction, a motion guiding assembly is arranged between the base 109 and each inner layer element. In this embodiment, the motion guiding assembly comprises a guiding portion arranged on the base 109 and a guided portion arranged on the inner layer element. More specifically, taking the first stage ventilation assembly 105 as an example, a protrusion 424 (see the protrusion 424 in FIG. 4B) is provided on an outer surface of the stem portion 262 of the inner layer element 111, while an elongated groove 217 extending along the x-direction is provided at the corresponding position of the base 109, and the protrusion 424 can move along the x-direction in the elongated groove 217 to guide the motion of the inner layer element 111 relative to the base 109. Although not specifically shown in the drawings, it can be understood by those skilled in the art that such a motion guiding assembly is also provided between the inner layer elements of other ventilation assemblies and the base 109.

In order to better guide the upward or downward motion of the outer layer element of each of the stage ventilation assemblies 105, 106, 107 along the x-direction, such a motion guiding assembly is also provided between each outer layer element and its adjacent inner layer element or housing 101. In this embodiment, the motion guiding assembly comprises a guiding portion arranged on the inner layer element or the housing, and a guiding portion arranged on the outer side wall of the outer layer element. This will be described in further detail below in connection with FIGS. 4A-6B. The upward motion of the inner layer element along the x-direction and the downward motion of the outer layer element along the x-direction can be facilitated by providing such a motion guiding assembly.

The base 109 comprises four layers of fan-shaped rings with different radii, and the base 109 also has a radial rib 295. The radial rib 295 extends along the radial direction of the base 109 to connect the various layers of fan-shaped rings and block the inner layer element when it moves downward.

Figure 3A:
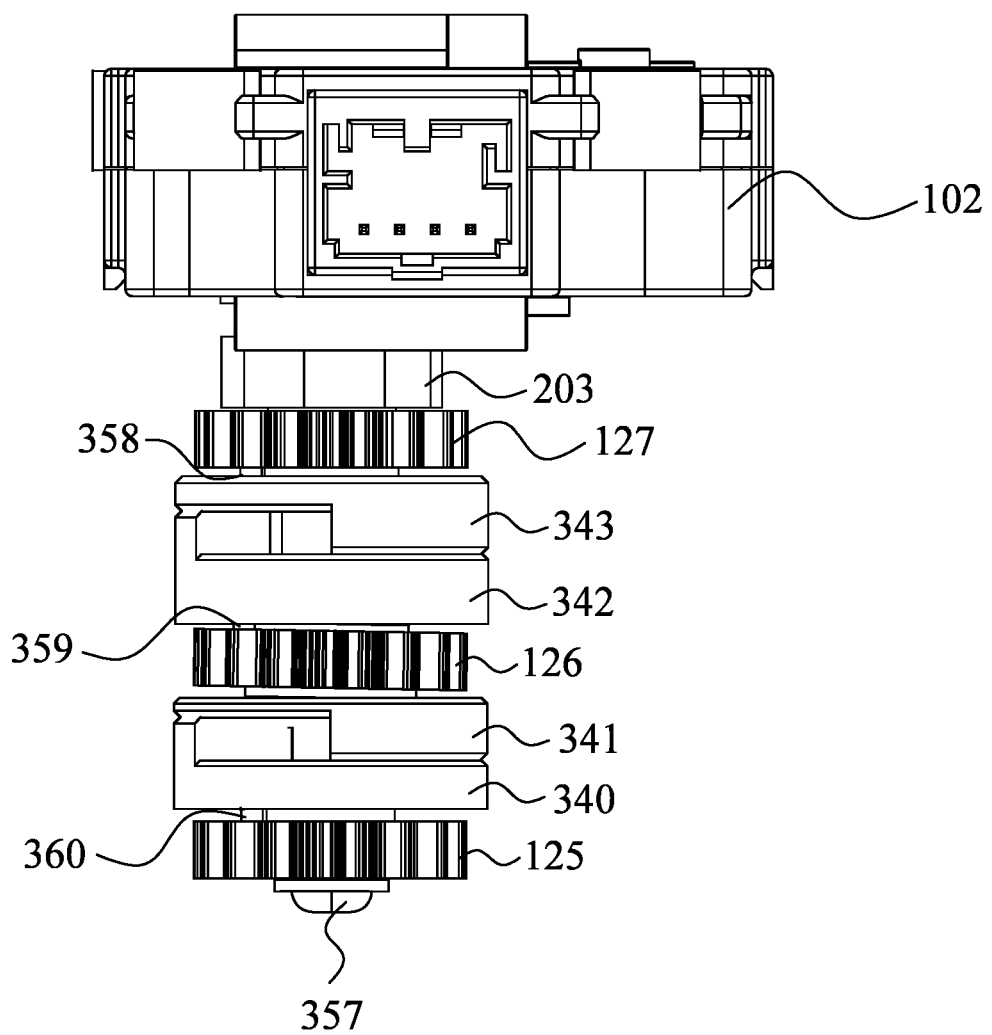
FIG. 3A is a perspective view of a driving device and a transmission assembly of the vent device of FIG. 2B.
Figure 3B:
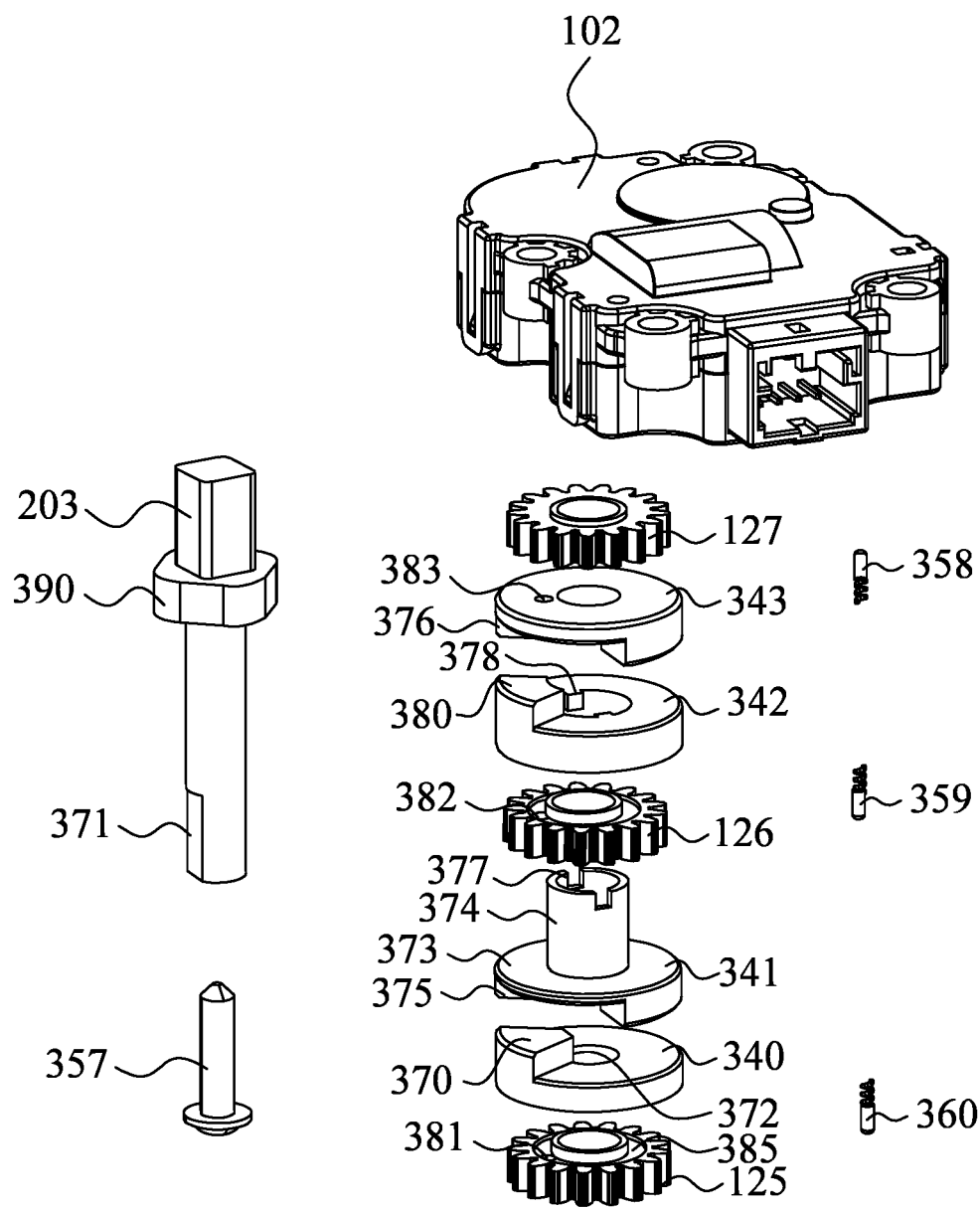
FIG. 3B is an exploded view of the driving device and transmission assembly of FIG. 3A.

FIGS. 3A and 3B show the structure of the driving device and the transmission assembly 118, for explaining the process in which the driving device selects the first stage transmission gear 125, the second stage transmission gear 126 or the third stage transmission gear 127 for transmission. FIG. 3A shows the overall structure and FIG. 3B shows the exploded structure.

As shown in FIGS. 3A and 3B, the transmission assembly 118 further comprises a first stage clutch device, a second stage clutch device and a third stage clutch device. The driving shaft 203 is engaged with or disengaged from the first stage transmission gear 125, the second stage transmission gear 126 and the third stage transmission gear 127 through the first stage clutch device, the second stage clutch device and the third stage clutch device, respectively. As an example, in a first angular range of rotation of the driving shaft 203, the driving shaft 203 is engaged with the first stage transmission gear 125 through the first stage clutch device, and disengaged from the second stage transmission gear 126 and the third stage transmission gear 127 through the second stage clutch device and the third stage clutch device. In a second angular range of rotation of the driving shaft 203, the driving shaft 203 is engaged with the second stage transmission gear 126 through the second stage clutch device, and disengaged from the first stage transmission gear 125 and the third stage transmission gear 127 through the first stage clutch device and the third stage clutch device. In a third angular range of rotation of the driving shaft 203, the driving shaft 203 is engaged with the third stage transmission gear 127 through the third stage clutch device, and disengaged from the first stage transmission gear 125 and the second stage transmission gear 126 through the first stage clutch device and the second stage clutch device.

Specifically, the transmission assembly 118 comprises a first driving disk 340, a second driving disk 341, a third driving disk 342 and a fourth driving disk 343, through which the driving shaft 203 sequentially passes from bottom to top. The top of the driving shaft 203 has a stopping step 390, and the bottom thereof is connected to a screw 357. The stopping step 390 and the screw 357 can delimit two ends of the driving shaft 203 together to limit the axial position of various components connected to the driving shaft 203 along the driving shaft 203. In this embodiment, the first stage transmission gear 125 is disposed between the first driving disk 340 and the screw 357 and connected to the first driving disk 340 through a spring-mounted roller 360, the second stage transmission gear 126 is disposed between the second driving disk 341 and the third driving disk 342 and connected to the third driving disk 342 through a spring-mounted roller 359, and the third stage transmission gear 127 is disposed between the fourth driving disk 343 and the stopping step 390 and connected to the fourth driving disk 343 through a spring-mounted roller 358.

The driving shaft 203 passes through the first driving disk 340 and is connected to the first driving disk 340. The first driving disk 340 can rotate along with the rotation of the driving shaft 203. As an example, the lower end of the driving shaft 203 is provided with a flat side surface 371, and the wall of a shaft hole of the first driving disk 340 has a flat surface 372 configured to mate with the flat surface 371, so that the first driving disk 340 can be driven by the driving shaft 203. In other cases, other mating structures may be provided to enable the first driving disk 340 to be driven by the driving shaft 203.

The second driving disk 341 comprises a base disk 373 and a cylindrical portion 374 connected to the base disk 373 and extending upward. A top surface of the first driving disk 340 is provided with an upwardly protruding protrusion 370, and a bottom surface of the base disk 373 of the second driving disk 341 is provided with an upwardly recessed indent 375 at a corresponding position. The protrusion 370 is accommodated in the indent 375. As an example, the angle range of the indent 375 in the circumferential direction is greater than the angle range of the protrusion 370 in the circumferential direction, such that the first driving disk 340 does not drive the second driving disk 341 to rotate when the driving shaft 203 rotates within the first angular range, and the first driving disk 340 cannot drive the second driving disk 341 to rotate together until the protrusion 370 abuts against the wall of the indent 375.

A pair of notches 377 are formed at a top end of the cylindrical portion 374 of the second driving disk 341, which are formed by extending downward from the top end of the cylindrical portion 374. The wall of a shaft hole of the third driving disk 342 has a pair of protrusions 378 configured to mate with the pair of notches 377, such that the third driving disk 342 can rotate along with the rotation of the second driving disk 341.

A top surface of the third driving disk 342 is provided with an upwardly protruding protrusion 380, and a bottom surface of the fourth driving disk 343 is provided with an upwardly recessed indent 376. The protrusion 380 is accommodated in the indent 376. The angle range of the indent 376 in the circumferential direction is larger than the angle range of the protrusion 380 in the circumferential direction, such that the third driving disk 342 does not drive the fourth driving disk 343 to rotate when the driving shaft 203 rotates within the second angular range, and the third driving disk 342 cannot drive the fourth driving disk 343 to rotate until the driving shaft rotates beyond the second angular range.

When the driving shaft 203 rotates within the third angular range, the first driving disk 340, the second driving disk 341, the third driving disk 342 and the fourth driving disk 343 can rotate together.

Therefore, the driving shaft 203 can drive different driving disks to rotate in stages within an appropriate rotation angular range.

It can be understood by those skilled in the art that the corresponding first and second angular ranges of the driving shaft 203 can be obtained by appropriately configuring the circumferential widths of the indent 375 and the protrusion 370 and the circumferential angle ranges of the indent 376 and the protrusion 380, and the third angular range can be configured by a limiting structure of the third stage transmission gear. As a specific example, the first angular range of the driving shaft 203 is approximately 0-15°, the second angular range thereof is approximately 15-25°, and the third angular range thereof is approximately 25-35°.

The top of the first stage transmission gear 125 has an annular groove 385 extending downward around a gear shaft hole, and the bottom of the annular groove 385 is provided with a spherical bottom groove 381 extending further downward. The spring-mounted roller 360 has a roller end at lower side thereof and a spring end at upper side thereof, wherein the roller end has a spherical surface and the spring end can be compressed. The spherical bottom groove 381 is used to accommodate the roller end of the spring-mounted roller 360. As an example, the bottom of the spherical bottom groove 381 and the roller end of the spring-mounted roller 360 are smooth spherical surfaces mating with each other. Although not shown in FIG. 3B, it can be understood that the bottom surface of the first driving disk 340 is provided with a recess for accommodating and securing the spring end of the spring-mounted roller 360, and the spring end can only extend and retract within the recess without escaping from the recess. Therefore, the first stage transmission gear 125 and the first driving disk 340 can be connected together by the spring-mounted roller 360.

When the first driving disk 340 starts to rotate, the first driving disk 340 can drive the first stage transmission gear 125 to rotate together by means of the spring-mounted roller 360. However, when the first stage transmission gear 125 reaches a limit position and can no longer rotate, there is a tendency of relative motion between the spring-mounted roller 360 and the spherical bottom groove 381, and the spring end of the spring-mounted roller 360 is compressed, so that the spring-mounted roller 360 can escape from the spherical bottom groove 381 and thus no longer drives the first stage transmission gear 125, instead, it moves along the circumferential direction in the annular groove 385 along with the rotation of the first driving disk 340. As an example, the limit position of the first stage transmission gear 125 can be set to be consistent with the maximum value of the first angular range of the driving shaft 203, so that when the first driving disk 340 drives the second driving disk 341, the spring-mounted roller 360 is just disengaged from the first stage transmission gear 125.

The top of the second stage transmission gear 126 also has a spherical bottom groove 381. The spherical bottom groove 381 is used to accommodate the roller end of the spring-mounted roller 359. A groove for accommodating the spring end of the spring-mounted roller 359 is provided in the bottom surface of the third driving disk 342. Similarly, the bottom of the spherical bottom groove 381 and the roller end of the spring-mounted roller 359 are smooth spherical surfaces mating with each other. Therefore, the second stage transmission gear 126 and the third driving disk 342 can be connected together by the spring-mounted roller 359.

When the third driving disk 342 starts to rotate, the third driving disk 342 can drive the second stage transmission gear 126 to rotate together by means of the spring-mounted roller 359. However, when the second stage transmission gear 126 reaches a limit position and can no longer rotate, there is a tendency of relative motion between the spring-mounted roller 359 and the spherical bottom groove 382, and the spring end of the spring-mounted roller 359 is compressed, so that the spring-mounted roller 359 can escape from the spherical bottom groove 382 and thus no longer drives the second stage transmission gear 126, instead, it moves along the circumferential direction in the annular groove of the second stage transmission gear 126 with the rotation of the third driving disk 342. As an example, the limit position of the second stage transmission gear 126 can be set to be consistent with the maximum value of the second angular range of the driving shaft 203, so that when the third driving disk 342 drives the fourth driving disk 343, the spring-mounted roller 359 is just disengaged from the second stage transmission gear 126.

Different from the aforementioned two stages of gears, the roller end of the spring-mounted roller 358 is located above the spring end, and the spherical bottom groove of the third stage transmission gear 127 for accommodating the roller end of the spring-mounted roller 358 is provided at the bottom of the third stage transmission gear 127 (not shown), and a groove 383 for accommodating the spring end of the spring-mounted roller 358 is provided in the top surface of the fourth driving disk 343. However, it can be understood that the bottom of the spherical bottom groove in the third stage transmission gear 127 and the roller end of the spring-mounted roller 358 are also smooth spherical surfaces mating with each other. Therefore, the third stage transmission gear 127 and the fourth driving disk 343 can be connected together by the spring-mounted roller 358.

When the fourth driving disk 343 starts to rotate, the fourth driving disk 343 can drive the third stage transmission gear 127 to rotate together by mean of the spring-mounted roller 358. However, when the third stage transmission gear 127 reaches a limit position and can no longer rotate, there is a tendency of relative motion between the spring-mounted roller 358 and the spherical bottom groove of the third stage transmission gear 127, and the spring end of the spring-mounted roller 358 is compressed, so that the spring-mounted roller 358 can escape from the spherical bottom groove of the third stage transmission gear 127, and thus no longer drives the third stage transmission gear 127, instead, it moves along the circumferential direction in the annular groove of the third stage transmission gear 127 with the rotation of the fourth driving disk 343. As an example, the limit position of the third stage transmission gear 127 can be set to be consistent with the maximum value of the third angular range of the driving shaft 203, so that the driving shaft 203 will no longer drive any one of the above-mentioned gears after the driving shaft 203 rotates beyond the maximum rotation position.

Therefore, the first driving disk 340 and the spring-mounted roller 360 together form the first stage clutch device; the second driving disk 341, the third driving disk 342 and the spring-mounted roller 359 together form the second stage clutch device; and the fourth driving disk 343 and the spring-mounted roller 358 together form the third stage clutch device.

When the driving shaft 203 rotates within the first angular range, the driving shaft 203 drives the first stage transmission gear 125 to rotate by means of the first driving disk 340 and the spring-mounted roller 360, while other driving disks and gears do not rotate.

When the driving shaft 203 rotates within the second angular range, the spring-mounted roller 360 is disengaged from the first stage transmission gear 125, the first driving disk 340 drives the second driving disk 341 to rotate, and the second driving disk 341, in turn, drives the third driving disk 342 to rotate. The rotation of the third driving disk 342 drives the second stage transmission gear 126 to rotate therewith. At this time, the fourth driving disk 343, the first stage transmission gear 125 and the third stage transmission gear 127 do not rotate.

When the driving shaft 203 rotates within the third angular range, the spring-mounted roller 359 is disengaged from the second stage transmission gear 126, the third driving disk 342 drives the fourth driving disk 343 to rotate, and the rotation of the fourth driving disk 343 drives the third stage transmission gear 127 to rotate therewith. At this time, all the driving disks rotate together, but the first stage transmission gear 125 and the second stage transmission gear 126 do not rotate.

When the driving shaft 203 rotates reversely, according to the reverse process, the wall of the groove drives the protrusion of the corresponding driving disk to rotate within the corresponding range, and the spring-mounted roller can return to the corresponding spherical bottom groove again, and the gears are selectively driven to rotate together with the driving disk again.

Therefore, the driving shaft 203 can sequentially drive different driving disks to rotate in different rotation angular ranges, and thus selectively drive different gears to rotate in sequence.

Figure 4A:
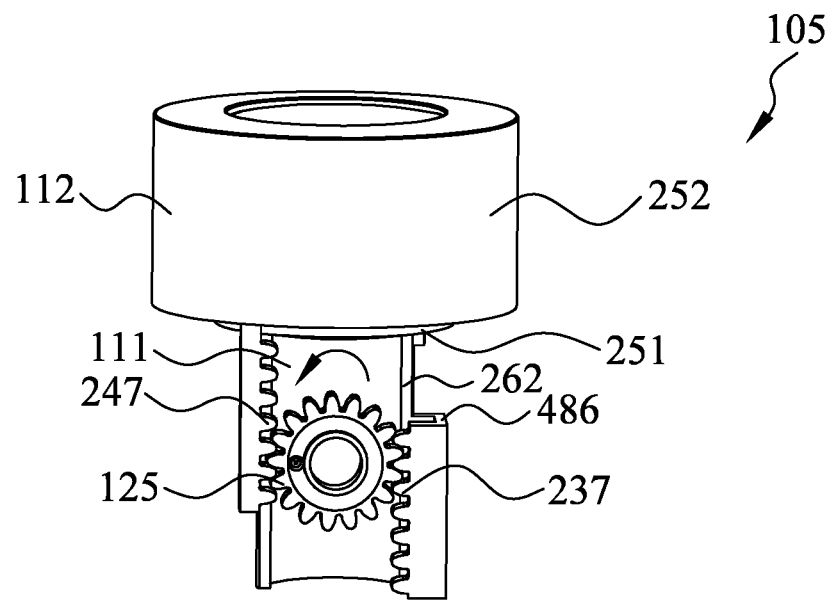
FIG. 4A is a perspective view of a first stage ventilation assembly and a first stage transmission gear of the vent device of FIG. 1A observed from the front.
Figure 4B:
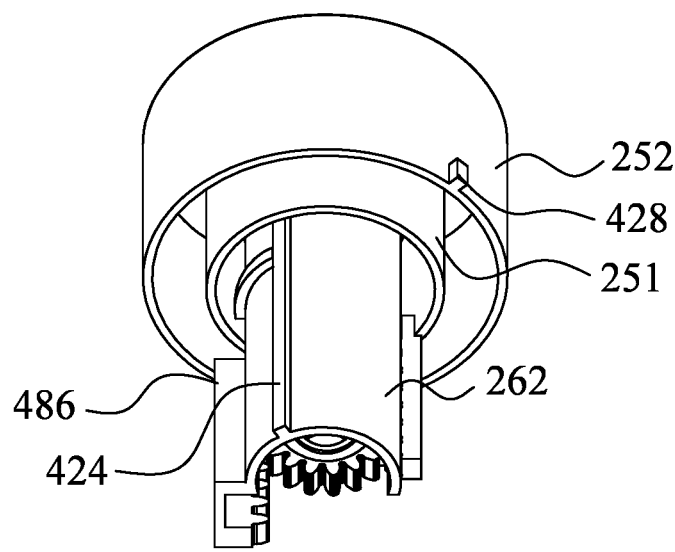
FIG. 4B is a perspective view of the first stage ventilation assembly and the first stage transmission gear of FIG. 4A observed from the back.

FIGS. 4A and 4B show more specific structures of the first stage ventilation assembly 105 and the first stage transmission gear 125 for explaining a process in which the first stage transmission gear 125 drives the inner layer element 111 and the outer layer element 112 in the first stage ventilation assembly 105.

As shown in FIG. 4A, the stem portion 262 of the inner layer element 111 has an opening extending along the longitudinal direction. A V-shaped part 486 extending in an outward V-shape is connected to an edge of the opening on the right side, and the V-shaped part 486 is provided with inner layer mesh teeth 237 for meshing with the right side of the first stage transmission gear 125. The inner layer mesh teeth 237 extend along the longitudinal direction (i.e., along the x-direction in FIG. 2A).

The bottom of the inner side wall 251 of the outer layer element 112 has outer layer mesh teeth 247 extending along the longitudinal direction (i.e., extending along the x-direction in FIG. 2A), and the outer layer mesh teeth 247 are configured to mesh with the left side of the first stage transmission gear 125. That is, the outer layer mesh teeth 247 of the outer layer element 112 and the inner layer mesh teeth 237 of the inner layer element 111 mesh with the first stage transmission gear 125 from the left and right sides, respectively. Therefore, when the first stage transmission gear 125 rotates counterclockwise, the outer layer element 112 can be driven to move downward by the outer layer mesh teeth 247, and the inner layer element 111 can be driven to move upward by the inner layer mesh teeth 237.

As shown in FIG. 4B, the outer surface of the outer side wall 252 of the outer layer element 112 is provided with a protrusion 428 protruding outward, and the protrusion 428 can mate with an elongated groove 529 (see FIG. 5B for details) of the inner layer element 113 of the second stage ventilation assembly 106 to guide the relative motion therebetween.

Figure 5A:
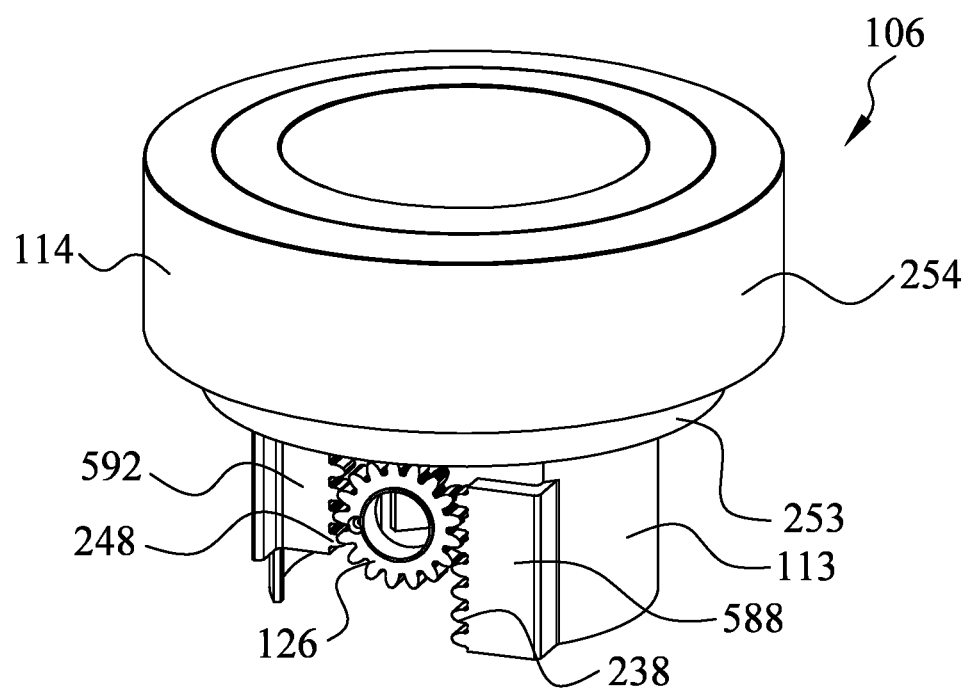
FIG. 5A is a perspective view of a second stage ventilation assembly and a second stage transmission gear of the vent device of FIG. 1A observed from the front.
Figure 5B:
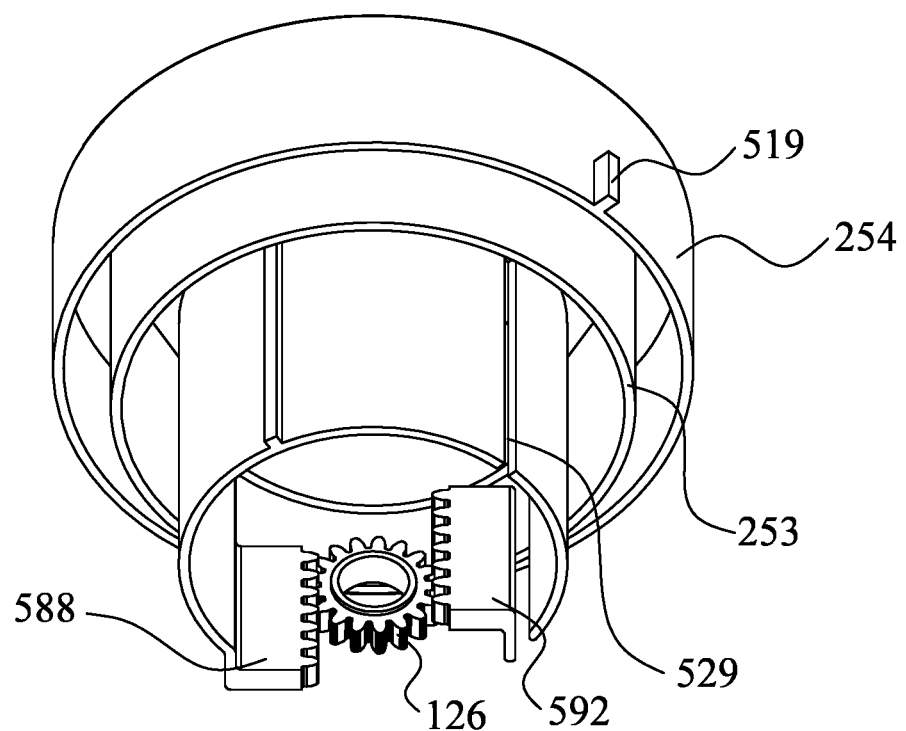
FIG. 5B is a perspective view of the second stage ventilation assembly and the second stage transmission gear of FIG. 5A observed from the back.

FIGS. 5A and 5B show more specific structures of the second stage ventilation assembly 106 and the second stage transmission gear 126 for explaining a process in which the second stage transmission gear 126 drives the inner layer element 113 and the outer layer element 114 in the second stage ventilation assembly 106.

As shown in FIG. 5A, the stem portion 264 of the inner layer element 113 has an opening extending along the longitudinal direction. A V-shaped part 588 extending in an outward V-shape is connected to an edge of the opening on the right side, and the V-shaped part 588 is provided with inner layer mesh teeth 238 for meshing with the right side of the second stage transmission gear 126. The inner layer mesh teeth 238 extend along the longitudinal direction (i.e., along the x-direction in FIG. 2A).

The bottom of the inner side wall 253 of the outer layer element 114 has a V-shaped part 592 with an inward V-shape, and the V-shaped part is provided with outer layer mesh teeth 248 extending along the longitudinal direction (i.e., extending along the x-direction in FIG. 2A), and the outer layer mesh teeth 248 are configured to mesh with the left side of the second stage transmission gear 126. That is, the outer layer mesh teeth 248 of the outer layer element 114 and the inner layer mesh teeth 238 of the inner layer element 113 mesh with the second stage transmission gear 126 from the left and right sides, respectively. Therefore, when the second stage transmission gear 126 rotates counterclockwise, the outer layer element 114 can be driven to move downward by the outer layer mesh teeth 248, and the inner layer element 113 can be driven to move upward by the inner layer mesh teeth 238.

As shown in FIG. 5B, the stem portion 264 of the inner layer element 113 is further provided with an elongated groove 529 as a guiding portion. When the second stage ventilation assembly 106 is arranged around the first stage ventilation assembly 105, the protrusion 428 of the outer layer element 112 of the first stage ventilation assembly 105 can be inserted into the elongated groove 529 of the inner layer element 113 of the second stage ventilation assembly 106, so that the elongated groove 529 can guide the moving direction of the outer layer element 112.

The outer surface of the outer side wall 254 of the outer layer element 114 is also provided with a protrusion 519 protruding outward, and the protrusion 519 is used as a guided portion for cooperating with the guiding portion on the adjacent inner layer element to guide the relative motion therebetween.

Figure 6A:
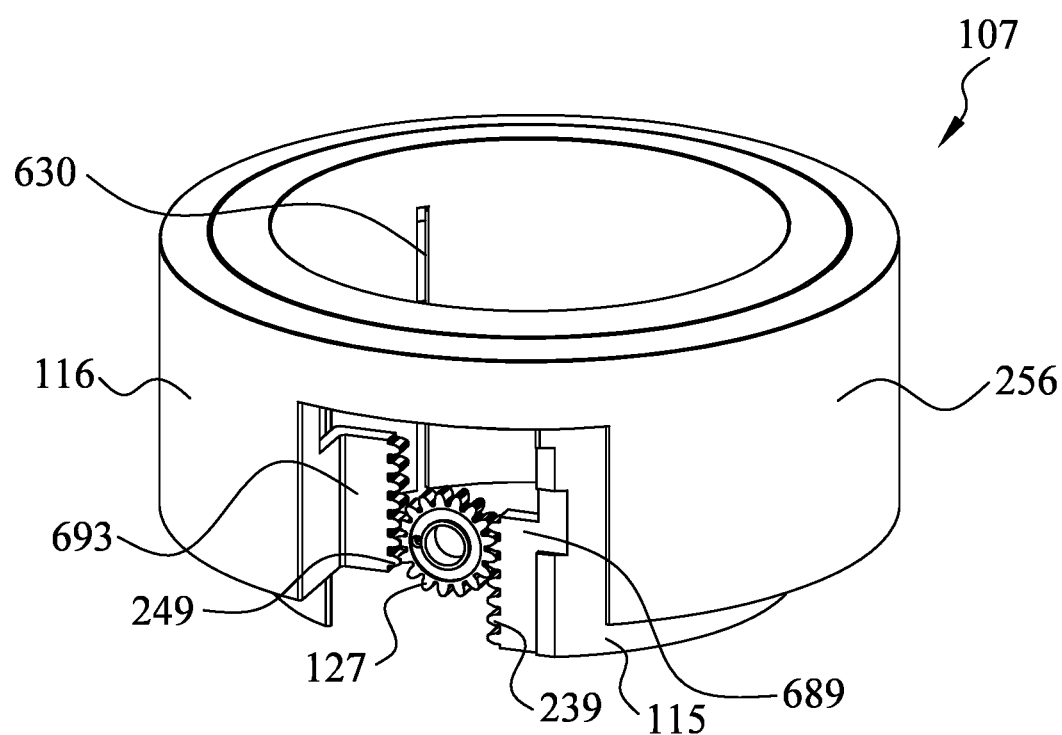
FIG. 6A is a perspective view of a third stage ventilation assembly and a third stage transmission gear of the vent device of FIG. 1A observed from the front.
Figure 6B:
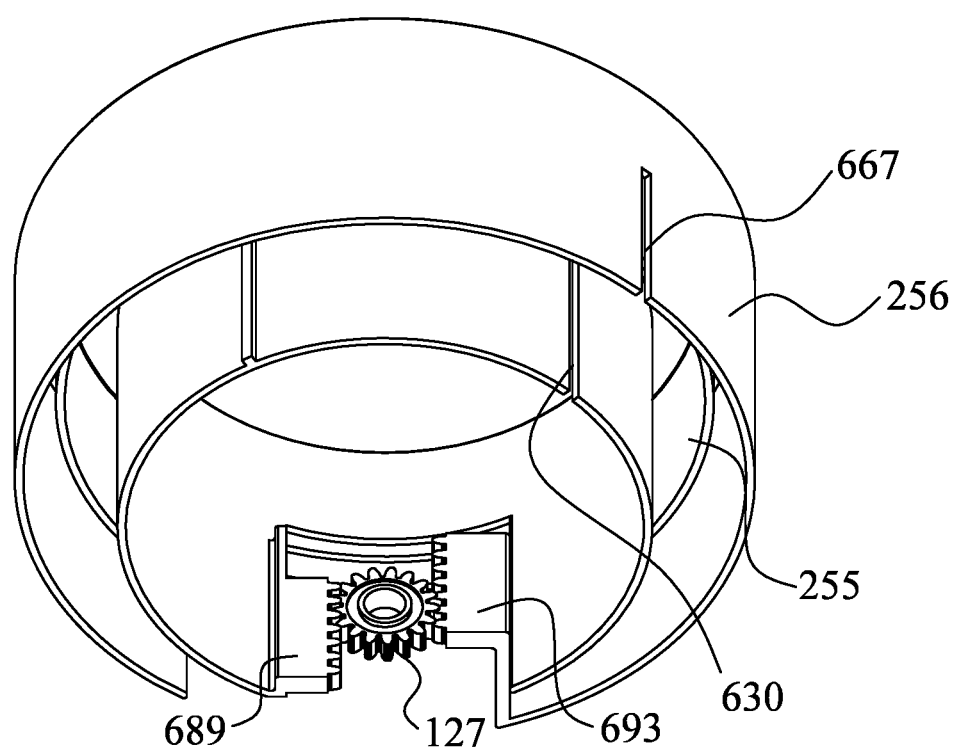
FIG. 6B is a perspective view of the third stage ventilation assembly and the third stage transmission gear of FIG. 6A observed from the back.

FIGS. 6A and 6B show more specific structures of the third stage ventilation assembly 107 and the third stage transmission gear 127 for explaining a process in which the third stage transmission gear 127 drives the inner layer element 115 and the outer layer element 116 in the third stage ventilation assembly 107.

As shown in FIG. 6A, the stem portion 266 of the inner layer element 115 has an opening extending along the longitudinal direction. A V-shaped part 689 extending in an inward V-shape is connected to an edge of the opening on the right side, and the V-shaped part 689 is provided with inner layer mesh teeth 239 for meshing with the right side of the third stage transmission gear 127. The inner layer mesh teeth 239 extend along the longitudinal direction (i.e., along the x-direction in FIG. 2A).

The bottom of the outer side wall 256 of the outer layer element 116 has a V-shaped part 693 with an inward V-shape, and the V-shaped part 693 is provided with outer layer mesh teeth 249 extending along the longitudinal direction (i.e., extending along the x-direction in FIG. 2A), and the outer layer mesh teeth 249 are configured to mesh with the left side of the third stage transmission gear 127. That is, the outer layer mesh teeth 249 of the outer layer element 116 and the inner layer mesh teeth 239 of the inner layer element 115 mesh with the third stage transmission gear 127 from the left and right sides, respectively. Therefore, when the third stage transmission gear 127 rotates counterclockwise, the outer layer element 116 can be driven to move downward by the outer layer mesh teeth 249, and the inner layer element 115 can be driven to move upward by the inner layer mesh teeth 239.

As shown in FIG. 6B, the stem portion 266 of the inner layer element 115 is further provided with an elongated groove 630 as a guiding portion. When the third stage ventilation assembly 107 is arranged around the second stage ventilation assembly 106, the protrusion 519 of the outer layer element 114 of the second stage ventilation assembly 106 can be inserted into the elongated groove 630 of the inner layer element 115 of the second stage ventilation assembly 106, so that the elongated groove 630 can guide the moving direction of the outer layer element 114.

The outer surface of the outer side wall 256 of the outer layer element 116 is provided with an elongated groove 667 as a guiding portion, and the elongated groove 667 can cooperate with the protrusion 204 (see the protrusion 204 in FIG. 2B) as a guided portion on the housing 101, so as to guide the relative motion therebetween.

Therefore, through the transmission of the first stage transmission gear 125, the second stage transmission gear 126 and the third stage transmission gear 127, the inner layer element and the outer layer element of each of the first stage ventilation assembly 105, the second stage ventilation assembly 106 and the third stage ventilation assembly 107 can move in opposite directions between the air duct open position and the air duct closed position of the corresponding ventilation assembly. And between adjacent ventilation assemblies, the adjacent inner layer element and outer layer element can also move in opposite directions while abutting on each other.

Figure 7:
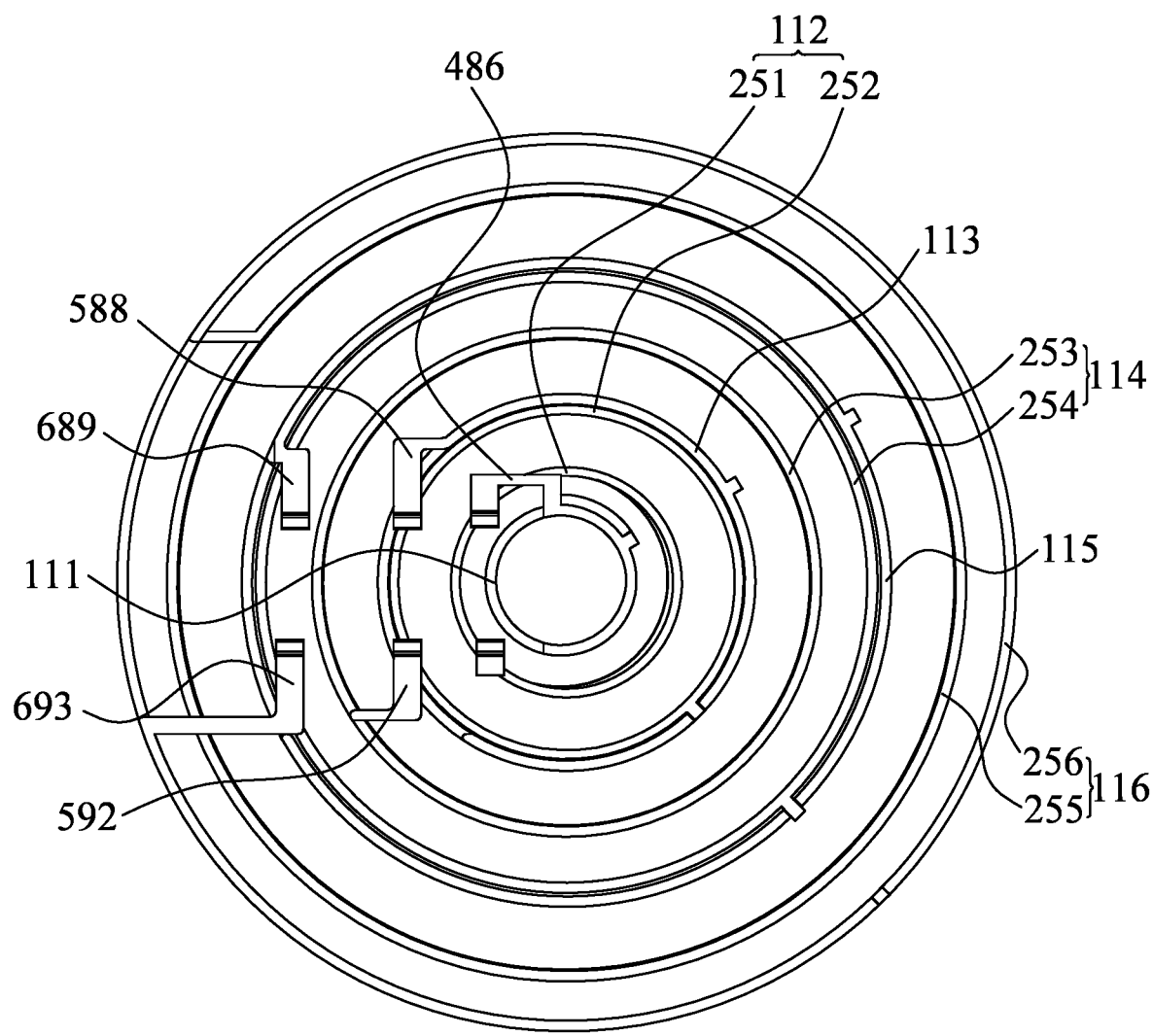
FIG. 7 is a bottom view of the first stage ventilation assembly, the second stage ventilation assembly and the third stage ventilation assembly of the vent device of FIG. 1A.

FIG. 7 is a bottom view of the first stage ventilation assembly 105, the second stage ventilation assembly 106, and the third stage ventilation assembly 107 for explaining the limiting structure in each of the stage ventilation assemblies 105, 106, 107 in detail.

As shown in FIG. 7, as an example, the limiting structure comprises the V-shaped parts arranged on the inner and outer layer elements of the stage ventilation assemblies 105, 106, 107 and the radial rib arranged on the base 109. These V-shaped parts are arranged in the path of the relative motion of the outer and inner layer elements, and the position of the adjacent outer layer elements during upward or downward motion is limited by the V-shaped parts, so that the V-shaped part can prevent the inner and outer layer elements from moving relative to each other further when each of the stage ventilation assemblies 105, 106, 107 reaches the air duct open position. The radial rib can prevent the inner and outer layer elements from moving relative to each other further when each of the stage ventilation assemblies 105, 106, 107 reaches the air duct closed position. In other examples, the limiting structure may also comprise an elongated groove as a motion guiding assembly arranged on the base 109, for example, by setting the length of the elongated groove on the base to limit the position of the inner layer element during the motion.

Specifically, when each of the stage ventilation assemblies 105, 106, 107 moves to its air duct open position, for the first stage ventilation assembly 105, the inner layer element 111 moves upward and the outer layer element 112 moves downward until the bottom surface of the inner side wall 251 of the outer layer element 112 abuts against the top end surface of the V-shaped part 486 of the inner layer element 111, and then the outer layer element 112 and the inner layer element 111 cannot move relative to each other further, so that the first stage transmission gear 125 reaches the limit position and cannot rotate further, and the first stage ventilation assembly 105 reaches its air duct open position. Similarly, for the second stage ventilation assembly 106, the inner layer element 113 moves upward and the outer layer element 114 moves downward until the V-shaped part 588 of the inner layer element 113 abuts against the outer side wall 252 of the adjacent outer layer element 112 on the inner side, and then the inner layer element 113 cannot move upward further, so that the second stage transmission gear 126 cannot rotate further and the second stage ventilation assembly 106 reaches its air duct open position. For the third stage ventilation assembly 107, the inner layer element 115 moves upward and the outer layer element 116 moves downward until the V-shaped part 689 of the inner layer element 115 abuts against the outer side wall 254 of the adjacent outer layer element 114 on the inner side, and then the inner layer element 115 cannot move upward further, so that the third stage transmission gear 127 cannot rotate further, and the third stage ventilation assembly 107 also reaches its air duct open position.

When each of the stage ventilation assemblies 105, 106, 107 moves towards its air duct closed position, for the third stage ventilation assembly 107, the outer layer element 116 moves upward and the inner layer element 115 moves downward until the inner layer element 115 abuts against the radial rib 295 of the base 109, and then the inner layer element 115 cannot move downward further, so that the third stage transmission gear 127 cannot rotate further and the third stage ventilation assembly 107 reaches its air duct closed position. For the second stage ventilation assembly 106, the outer layer element 114 moves upward and the inner layer element 113 moves downward until the inner layer element 113 abuts against the radial rib 295 of the base 109, and then the inner layer element 113 cannot move downward further, so that the second stage transmission gear 126 cannot rotate further, and the second stage ventilation assembly 106 reaches its air duct closed position. For the first stage ventilation assembly 105, the outer layer element 112 moves upward and the inner layer element 111 moves downward until the inner layer element 111 abuts against the radial rib 295 of the base 109, and then the inner layer element 111 cannot move downward further, so that the first stage transmission gear 125 cannot rotate further, and the first stage ventilation assembly 105 reaches its air duct closed position.

Figure 8A:
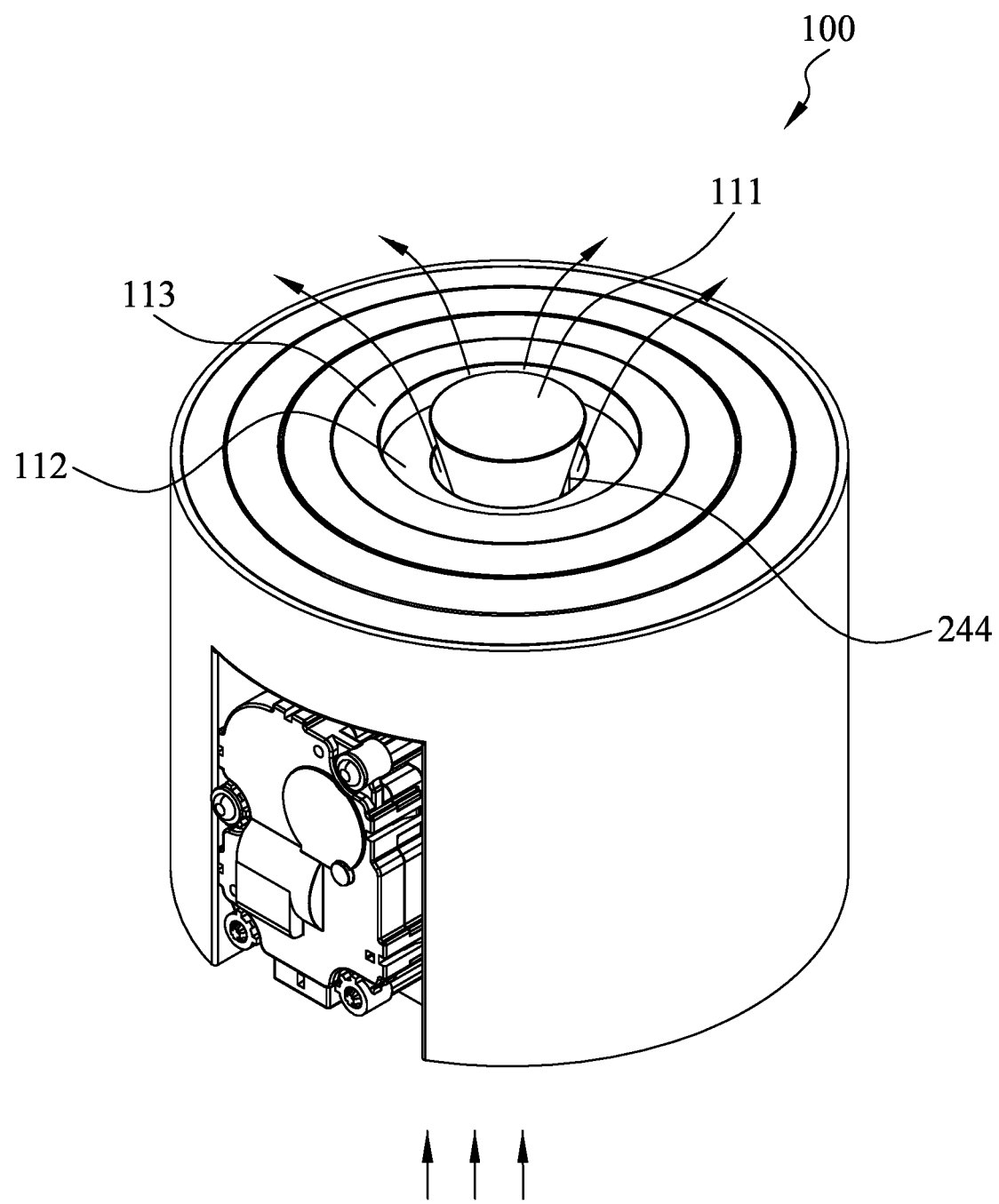
FIG. 8A is a perspective view of the vent device of FIG. 1A with the first stage ventilation assembly in an open position.
Figure 8B:
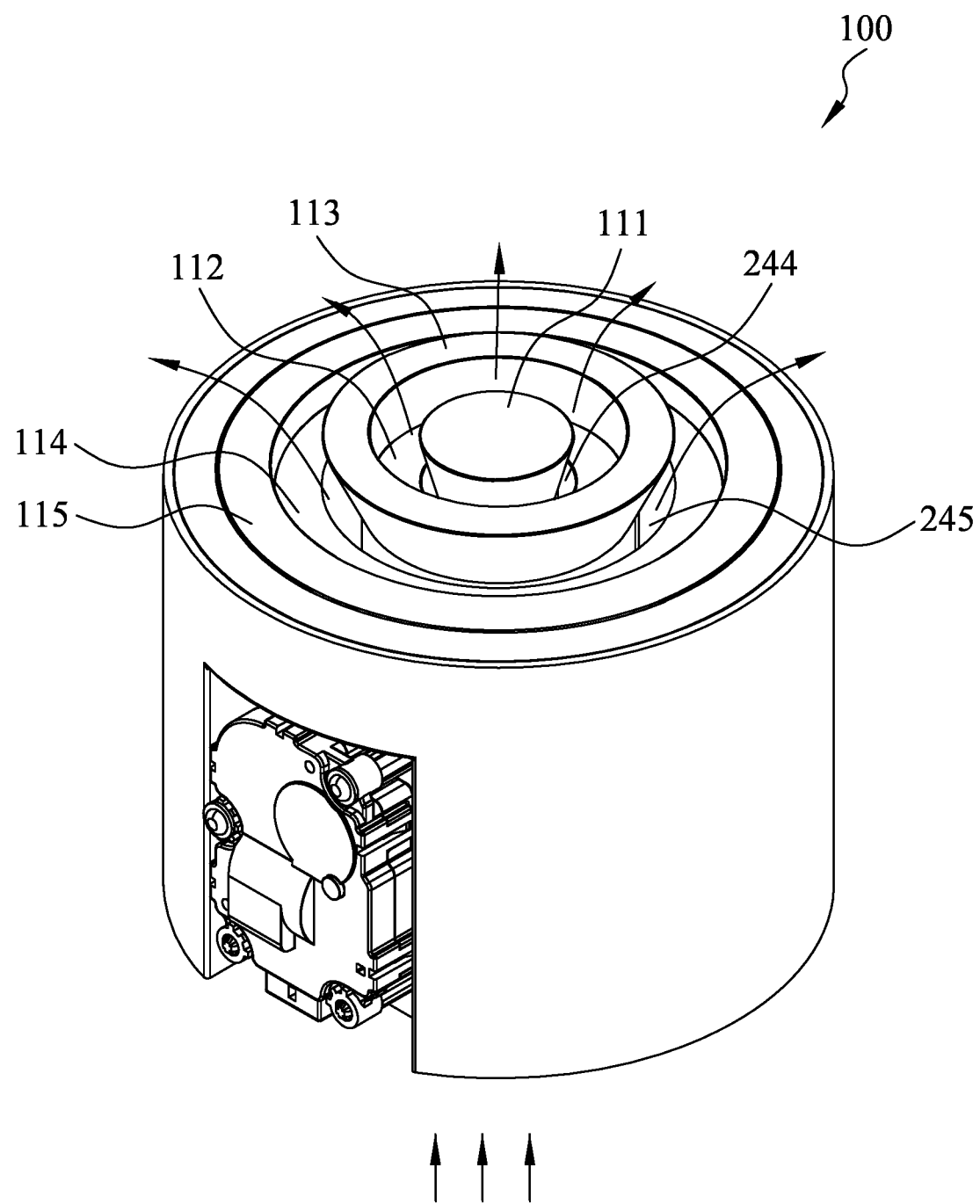
FIG. 8B is a perspective view of the vent device of FIG. 1A with the first stage ventilation assembly and the second stage ventilation assembly in an open position.
Figure 8C:
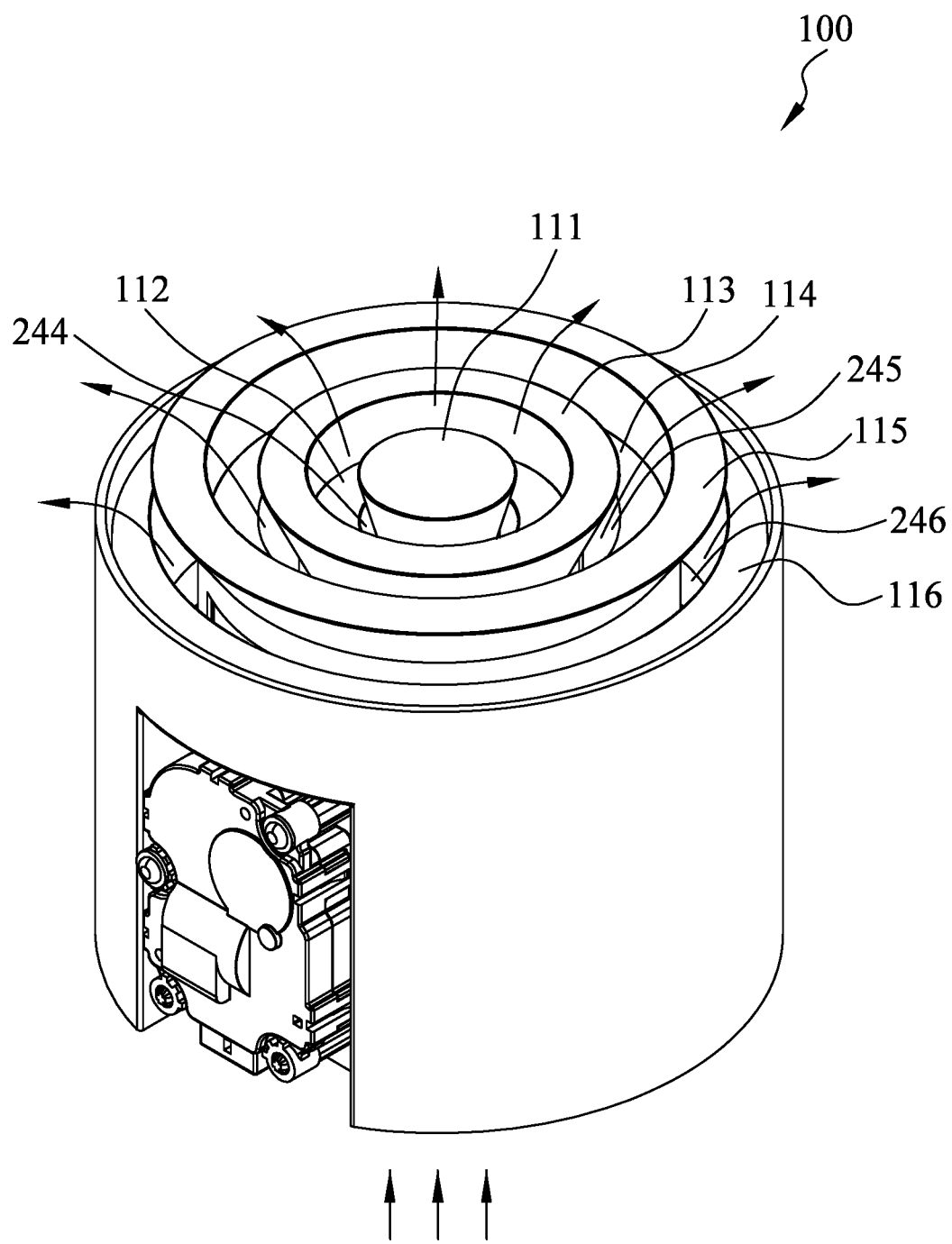
FIG. 8C is a perspective view of the vent device of FIG. 1A with the first stage ventilation assembly, the second stage ventilation assembly and the third stage ventilation assembly in an open position.

FIGS. 8A-8C are perspective structural views of the vent device 100 in different open positions, in which FIG. 8A shows the first stage ventilation assembly 105 in its air duct open position, FIG. 8B shows the second stage ventilation assembly 106 in its air duct open position, and FIG. 8C shows the third stage ventilation assembly 107 in its air duct open position.

As shown in FIG. 8A, the inner layer element 111 of the first stage ventilation assembly 105 moves upward and the outer layer element 112 moves downward, so that the air duct outlet 244 of the first stage air duct 234 is opened and the first stage ventilation assembly 105 is in its air duct open position. The airflow passes through the first stage air duct 234 from the bottom of the vent device 100 and is discharged from the air duct outlet 244. The discharged airflow is discharged along the guiding portion of the inner layer element 111 in an annular diffusion manner. In the process of the airflow exiting the air duct outlet 244, the outer layer element 112 and the inner layer element 113 of the second stage ventilation assembly 106 are spaced apart by a certain distance in the x-direction, so that the inner side wall of the inner layer element 113 can also have function for limiting the airflow to some extent, so that the airflow can flow intensively along the guiding portion of the inner layer element 111.

As shown in FIG. 8B, when the first stage ventilation assembly 105 is in its air duct open position, the inner layer element 113 of the second stage ventilation assembly 106 also moves upward and the outer layer element 114 moves downward, so that the air duct outlet 245 of the second stage air duct 235 also opens, and both the first stage ventilation assembly 105 and the second stage ventilation assembly 106 are in their air duct open positions. The airflow simultaneously passes through the first stage air duct 234 and the second stage air duct 235 from the bottom of the vent device 100, and is simultaneously discharged from the air duct outlet 244 and the air duct outlet 245. The discharged airflow is discharged along the guiding portions of the inner layer element 111 and the inner layer element 113, respectively, in an annular diffusion manner. Similarly, in the process of the airflow exiting the air duct outlet 245, the inner side wall of the inner layer element 115 of the third stage ventilation assembly 107 can also have function for limiting to some extent, so that the airflow can intensively flow along the guiding portion of the inner layer element 113.

As shown in FIG. 8C, when the first stage ventilation assembly 105 and the second stage ventilation assembly 106 are in their air duct open positions, the inner layer element 115 of the third stage ventilation assembly 107 also moves upward and the outer layer element 116 moves downward, so that the air duct outlet 246 of the third stage air duct 236 also opens, and the first stage ventilation assembly 105, the second stage ventilation assembly 106 and the third stage ventilation assembly 107 are all in their air duct open positions. The airflow simultaneously passes through the first stage air duct 234, the second stage air duct 235 and the third stage air duct 236 from the bottom of the vent device 100, and is simultaneously discharged from the air duct outlets 244, 245 and 246. The discharged airflow is discharged along the guiding portions of the inner layer element 111, the inner layer element 113 and the inner layer element 115 in an annular diffusion manner. Similarly, in the process of the airflow exiting the air duct outlet 246, the inner side wall of the housing 101 can also have function for limiting to some extent, so that the airflow can intensively flow along the guiding portion of the inner layer element 115.

Therefore, according to the sequence of FIGS. 8A-8C, the first stage ventilation assembly 105, the second stage ventilation assembly 106 and the third stage ventilation assembly 107 can be opened in sequence. According to the sequence of FIG. 8C, FIG. 8B and FIG. 8A, the third stage ventilation assembly 107, the second stage ventilation assembly 106 and the first stage ventilation assembly 105 can be closed in sequence.

The vent device of the present disclosure comprises inner layer elements and outer layer elements which move relative to each other along the x-direction to form annular air ducts and air duct outlets, and the airflow after temperature adjustment by a vehicle air conditioner can be diffused along the annular direction, and the airflow is divergent and soft. The guiding portion comprising a tapered section shape on the inner layer element has the function of guiding the airflow as well as closing the air duct outlet. Depending on the space of the vehicle and the position of the vent device, the taper angle of the tapered section of the guiding portion can be flexibly set, which can not only ensure the softness of diffused airflow, but can also cover a larger air blowing space.

The motor of the vent device of the present disclosure is connected to a central control system of the vehicle, and the rotation angle of the driving shaft is controlled by the central control system of the vehicle, which in turn controls the opening of different air duct outlets, so that the wind direction of the outlet air can be set more flexibly. It can be understood by those skilled in the art that although the vent device in this embodiment comprises three stage ventilation assemblies, more or fewer ventilation assemblies can be provided according to actual needs, as long as corresponding transmission assemblies are provided accordingly.

Although the present disclosure has been described with reference to the specific embodiments shown in the accompanying drawings, it should be understood that the vent device of the present disclosure can have many variations without departing from the spirit, scope and background of the teachings of the present disclosure. Those of ordinary skill in the art will also appreciate that there are different ways to alter the structure in the embodiments disclosed in the present disclosure, and all the alterations fall within the spirit and scope of the present disclosure and claims.

The invention claimed is:

1. A vent device, comprising:
    at least one stage ventilation assembly including an inner layer element and an outer layer element, the outer layer element having an inner side wall and an outer side wall disposed at a distance from the inner side wall, the inner and outer side walls being connected only by a top side of the outer layer element, the inner side wall defining a cavity extending along a first direction through the outer layer element, the inner layer element being arranged in the cavity; and
    an air duct formed between the outer layer element and the inner layer element, the air duct having an air duct outlet,
    wherein the outer layer element and the inner layer element are configured to move along the first direction relative to each other to move the at least one stage ventilation assembly between an air duct open position, in which the inner layer element opens the air duct outlet, and an air duct closed position, in which the inner layer element closes the air duct outlet.

2. The vent device according to claim 1, wherein the inner side wall of the outer layer element defines a cavity outlet end along the top side of the outer layer element forming the air duct outlet, and
    wherein the inner layer element includes a guiding portion having a tapered section, at least a portion of the tapered section having an outer circumferential dimension corresponding to an inner circumferential dimension of the top side of the outer layer element such that, in the air duct closed position, the at least portion of the tapered section engages the cavity outlet end to close the air duct outlet, and, in the air duct open position, the tapered section disengages the cavity outlet end and defines a discharge direction of an airflow that is discharged from the air duct outlet.

3. The vent device according to claim 2, wherein the inner layer element further includes a stem portion connected to the guiding portion, the stem portion being connected to a smaller dimension end of the tapered section, and
    wherein a gap is formed between the stem portion and the inner side wall of the outer layer element to form at least a portion of the air duct.

4. The vent device according to claim 2, wherein the at least one stage ventilation assembly includes a first stage ventilation assembly and a second stage ventilation assembly, and
    wherein the inner layer element of the second stage ventilation assembly is arranged around the outer layer element of the first stage ventilation assembly.

5. The vent device according to claim 4, further comprising:
    a driving device including a driving shaft extending along a second direction; and
    a transmission assembly connected to the driving shaft, wherein the transmission assembly is configured to selectively engage with the first stage ventilation assembly or the second stage ventilation assembly within different rotational angular ranges of the driving shaft to drive the outer layer element and the inner layer element of the first stage ventilation assembly or the second stage ventilation assembly to move relative to each other along the first direction by the driving device.

6. The vent device according to claim 5, wherein the transmission assembly includes a first stage transmission gear and a second stage transmission gear, each of the first stage and second stage transmission gears is configured to move the outer layer element and the inner layer element in the respective ventilation assembly along the first direction relative to each other,
    wherein the outer layer element of each of the first stage ventilation assembly and the second stage ventilation assembly includes outer layer mesh teeth arranged along the first direction,
    wherein the inner layer element of each of the first stage ventilation assembly and the second stage ventilation assembly includes inner layer mesh teeth arranged along the first direction, and
    wherein the outer layer mesh teeth and the inner layer mesh teeth are arranged on opposite sides of their respective one of the transmission gears and are meshed with the transmission gears.

7. The vent device according to claim 6, wherein the transmission assembly further includes a first stage clutch device and a second stage clutch device connected to the driving shaft,
    wherein the driving shaft is engaged with or disengaged from the first stage transmission gear through the first stage clutch device and the second stage transmission gear through the second stage clutch device,
    wherein the first stage clutch device is arranged within a first angular range of the driving shaft such that the driving shaft can engage the first stage ventilation assembly through the first stage transmission gear and is arranged within a second angular range of the driving shaft such that the driving shaft can disengage the first stage ventilation assembly, and
    wherein the second stage clutch device is arranged within a first angular range of the driving shaft such that the driving shaft can disengage the second stage ventilation assembly and is arranged within a second angular range of the driving shaft such that the driving shaft can engage the second stage ventilation assembly through the second stage transmission gear.

8. The vent device according to claim 1 further comprising:
    a base supporting the at least one stage ventilation assembly; and
    a motion guiding assembly including at least one guiding portion arranged on the base and a guided portion arranged on the inner layer element of the at least one stage ventilation assembly, the at least one guiding portion and the guided portion extending along a first direction and configured to define a moving direction of the inner layer element of the at least one stage ventilation assembly relative to the base.

9. The vent device according to claim 1 further comprising:
    a limiting structure arranged on the moving path of the inner layer element or the outer layer element of the at least one stage ventilation assembly, the limiting structure being configured such that when the at least one stage ventilation assembly reaches an air duct open position, the limiting structure prevents the inner layer element and the outer layer element from continuing to move relative to each other.

10. The vent device according to claim 1, wherein the inner layer element and the outer layer element of the at least one stage ventilation assembly are shaped such that the air duct formed therebetween is annular.

11. The vent device according to claim 1, wherein the inner side wall and the outer side wall of the outer layer element are coaxially aligned and cylindrically shaped.

* * * * *